United States Patent [19]

Blanchard, Jr. et al.

[11] Patent Number: 4,923,314

[45] Date of Patent: May 8, 1990

[54] THESAURUS FEATURE FOR ELECTRONIC TYPEWRITERS

[75] Inventors: Raymond A. Blanchard, Jr., Dryden; Richard E. Roberts, Cortland, both of N.Y.

[73] Assignee: Smith Corona Corporation, Del.

[21] Appl. No.: 141,247

[22] Filed: Jan. 6, 1988

[51] Int. Cl.$^5$ ............................................. B41J 5/30
[52] U.S. Cl. ..................................... 400/63; 400/62; 400/83; 400/144.2; 400/705.1; 364/419
[58] Field of Search ............... 400/63, 74, 83, 144.2, 400/279, 705.1, 3, 61, 62; 364/200, 300, 419, 900

[56] References Cited

U.S. PATENT DOCUMENTS

| | | | |
|---|---|---|---|
| 2,484,649 | 10/1949 | Root, III | 400/3 |
| 4,084,680 | 4/1978 | Deetz | 400/62 X |
| 4,207,612 | 6/1980 | Grier et al. | 400/3 X |
| 4,328,561 | 5/1982 | Convis et al. | 400/63 X |
| 4,383,307 | 5/1983 | Gibson, III | 400/63 X |
| 4,384,329 | 5/1983 | Rosenbaum et al. | 364/300 |
| 4,456,973 | 6/1984 | Carlgren et al. | 364/900 |
| 4,480,931 | 11/1984 | Kamikura et al. | 400/279 X |
| 4,580,241 | 4/1986 | Kucera | 400/63 X |
| 4,655,620 | 4/1987 | Adams et al. | 400/144.2 X |
| 4,672,571 | 6/1987 | Bass et al. | 400/63 X |
| 4,674,066 | 6/1987 | Kucera | 400/63 X |
| 4,689,768 | 8/1987 | Heard et al. | 400/61 X |
| 4,703,425 | 10/1987 | Muraki | 364/419 |

OTHER PUBLICATIONS

IBM Technical Disclosure Bulletin, "Spelling Checking Typewriter", Hackett, vol. 18, No. 2, Jul. 1975, pp. 530–531.

IBM Technical Disclosure Bulletin, "Precision Optical Emitters", Bateson et al., vol. 23, No. 11, Apr. 1981, pp. 5255–5257.

IBM Technical Disclosure Bulletin, "Spelling Dictionary Incorporating Word Association", Parott, vol. 25, No. 11B, Apr. 1983, pp. 6246–6247.

IBM Technical Disclosure Bulletin, "Automatic Use of a Thesaurus to Make Keyword Search More Usable", vol. 30, No. 12, May 1988, pp. 117–118.

Primary Examiner—Ernest T. Wright, Jr.

[57] ABSTRACT

A thesaurus feature for finding synonyms of words is provided for use with electronic typewriters having electronic spelling dictionaries for storing words in a data base contained in an electronic memory. Each word in the electronic dictionary which appears in the thesaurus is identified by a special code immediately following the word, so that the dictionary can be scanned quickly to determine if a given input word is in the thesaurus. If the word is in the thesaurus, the search for synonyms can proceed quickly. The input operations required of the typist are patterned after previously known operations to eliminate extensive learning or relearning on the part of the typist. Cascaded scanning of the display and listing operations are utilized to conserve time.

10 Claims, 5 Drawing Sheets

THESAURUS FEATURE FOR ELECTRONIC TYPEWRITERS

BACKGROUND OF INVENTION

1. Field of the Invention

This invention relates to a thesaurus feature for an electronic typewriter. More particularly, this invention relates to a thesaurus feature for electronic typewriters having electronic dictionaries.

2. Prior Art

Various thesaurus features have been proposed in the past, using such methods as the "key word" approach in which the input of a key word would return a list of words deemed synonymous with the key word. These arrangements allow synonyms to be found for a limited number of key or entry words. In this way, a large number of synonyms can be offered, but only a limited number of entry words can be provided. Such arrangements have the disadvantage of requiring large amounts of storage or memory space, which is economically not feasible.

SUMMARY OF THE INVENTION

In an electronic typewriter having an electronic spelling dictionary, each word which appears in the thesaurus is identified in the data base by a special code following the word. Thus, the software only has to call the dictionary routine, which is optimized for speed, to determine if the word is in the thesaurus. If not, the typist is notified immediately that no synonyms are available. If the word is in the thesaurus then the search proceeds with little time lost. Ease of use by the typist is obtained by integrating the operation of the thesaurus into the typewriter in the same manner as previously known features, so that the thesaurus feature does not require extensive learning or relearning on the part of the typist. By way of example, the teachings of the present invention might be applied to the electronic typewriter described in U.S. Pat. No. 4,655,620, Adams et al, entitled "Spelling Error Finding Feature Including an Electronic Spelling Feature".

In order to obtain the maximum database size in the smallest possible storage space, a "4 and 8 bit" code is used to code the characters. This is an easier and faster code to use for encoding and decoding, since the microprocessor used has instructions designed for manipulating 4 and 8 bit values efficiently.

Scanning is speeded up by displaying one occurrence of the input word while continuing to scan the data base for others. The typewriter can display the synonyms of the first occurrence while scanning for the second occurrence. In this manner the typist does not have to wait for the typewriter to scan the entire thesaurus before receiving a response.

Accordingly, a principal object of this invention is to provide a thesaurus feature for an electronic typewriter in which thesaurus words are identified in the dictionary feature in the typewriter memory, and the entire data base is scanned rather than using entry points or indexed lists.

Another object of the invention is to provide a thesaurus feature for an electronic typewriter in which scanning is speeded by displaying one occurrence of the input word while continuing to scan the data base for others, whereby the typewriter displays the synonyms of the first occurrence while scanning for the second occurrence.

Other objects, features and advantages of the invention will become more apparent from the following detailed description, when taken in connection with the accompanying drawings.

DETAILED DESCRIPTION OF THE INVENTION

Figure 1:
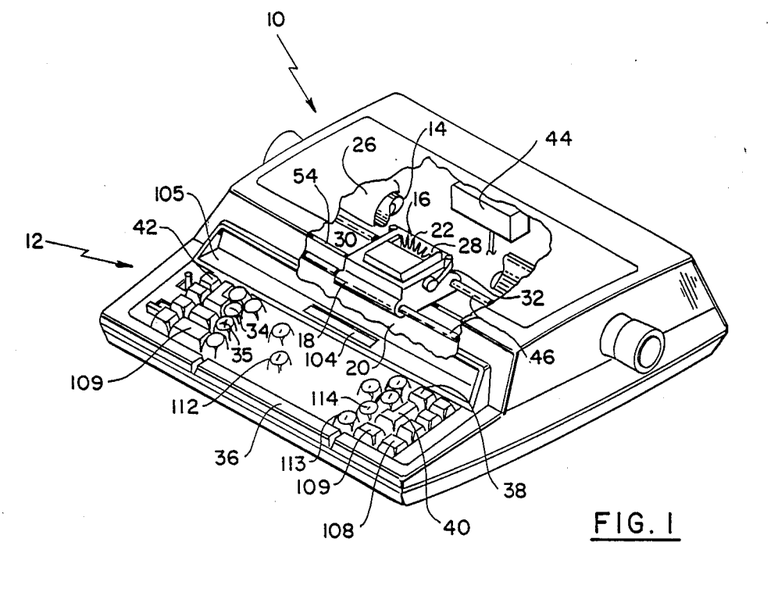
FIG. 1 is an isometric frontal diagrammatic view of an electronic typewriter sectioned to show components operated according to the teachings of the present invention.

An electronic correcting typewriter 10 according to the invention is shown in FIG. 1. Generally, an electronic typewriter 10 comprises a keyboard 12, a platen 14, a print wheel 16 and a carrier 18 mounted in the typewriter 10 for left and right horizontal movement along platen 14 as indicated by arrow 20.

Print wheel 16, also known as a "daisy" wheel, has a plurality of radial petals or spokes 22, each supporting a respective character of the keyboard 12. A print hammer 24 (FIG. 2) is positioned adjacent to print wheel 16 for striking an aligned petal 22 against a sheet of paper 26 or other recording medium supported on platen 14.

Figure 2:
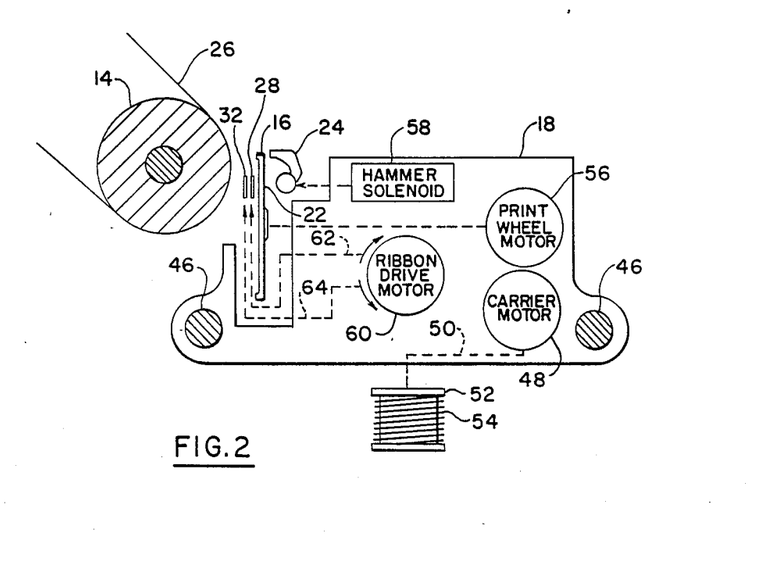
FIG. 2 is a diagrammatic side view of a print carrier and a platen of the electronic typewriter of FIG. 1.

A print ribbon mechanism includes an exposed portion of inked ribbon 28 extending from a cartridge 30 which is mounted on the carrier 18. Carrier 18 also supports a correction mechanism including a correction ribbon 32. Inked ribbon 28 may be inked fabric or carbon film type of ribbon and correction ribbon 32 may be of a type having a coating of adhesive or white overlay material for making lift-off or cover-up corrections.

Keyboard 12 contains the usual plurality of character keys 34 and carrier control function keys including a space bar 36, a backspace key 38, a carrier return key 40 and a code key 42. Upon actuation of any key on keyboard 12, a respective keyboard output signal is communicated to an electronic control circuit 44 (FIG. 3) which has various outputs controlling functions and operations of typewriter 10, principally, operation of the print wheel 16 and other components assembled on carrier 18.

More specifically, when a character key 34 is depressed to print, e.g., key 35 representing the letter "a", a unique signal representative of that character is communicated to control circuit 44 which in turn generates appropriate commands for (1) rotating the print wheel 16 to bring the selected character petal 22 upright (2) lifting the print ribbon 28 between the petal 22 and the sheet of paper 26, and (3) actuating the print hammer 24. The letter "a" will thus be imprinted over print ribbon 28 onto paper 26.

Further, when the space bar 36 is depressed, a unique signal representing a forward "space" move to the right is communicated to control circuit 44 which in turn controls the carrier 18 to move forward one character position without printing. In a similar manner, carrier 18 is controlled to move backwards one character position in response to actuation of the backspace key 38. When the carrier return key 40 is actuated, the carrier 18 is caused to move left to the position of the left margin or stop setting and the paper 26 is indexed or fed upwardly for exposing a fresh print line.

FIG. 2 shows a schematic diagram of the principal mechanisms assembled on carrier 18 and their relationship to platen 14. The showing of FIG. 2 is schematic only in order to facilitate an understanding.

As previously mentioned, carrier 18 is able to move horizontally to the left and right as indicated by arrow 20 on FIG. 1. Carrier 18 is supported to slide on guide rails 46 mounted to extend parallel to platen 14. A carrier motor 48 is coupled by a mechanical linkage, schematically represented by a broken line 50, to rotatively drive a cable pulley 52. A cable 54 is wound about pulley 52 in a manner permitting simultaneous winding and unwinding. The cable 54 is fixedly anchored to the typewriter 10 to prevent movement of the cable 54 in the direction of the carrier movement. Carrier motor 48 is operated under control of control circuit 44 for causing carrier 18 to move to the left or to the right along the platen 14 by the pulley 52 winding and unwinding along the fixedly anchored cable 54.

Print wheel 16 is operated by a print wheel motor 56 so that any radial petal 22 can be rotatively brought upright for printing. Print wheel motor 56 is also operated under control of control circuit 44. After the selected character petal 22 is located upright, hammer 24 is fired by a connected hammer solenoid 58 also under control of the control circuit 44. The upright petal 22 is deflected by the propelling hammer 24 to strike against the paper 26 on the platen 14 for either printing over print ribbon 28 or erasing over correction ribbon 32 when typewriter 10 is operated in correction mode.

The ribbons 28, 32 are operated by a ribbon drive motor 60 under control of the control circuit 44. A mechanical linkage, schematically represented by broken line 62, couples the ribbon drive motor 60 to operate print ribbon 28 and a mechanical linkage 64 is connected from the ribbon drive motor 60 to enable operation of the correction ribbon 32. The ribbon drive motor 60 operates one ribbon when driven in one direction and operates the other ribbon when driven in the other direction. For example, when the ribbon drive motor 60 is powered clockwise, the print ribbon 28 is raised and, when the ribbon drive motor 60 is operated in correction mode to rotate couterclockwise, the correction ribbon 32 is raised as is illustrated in FIG. 2.

Figure 3:
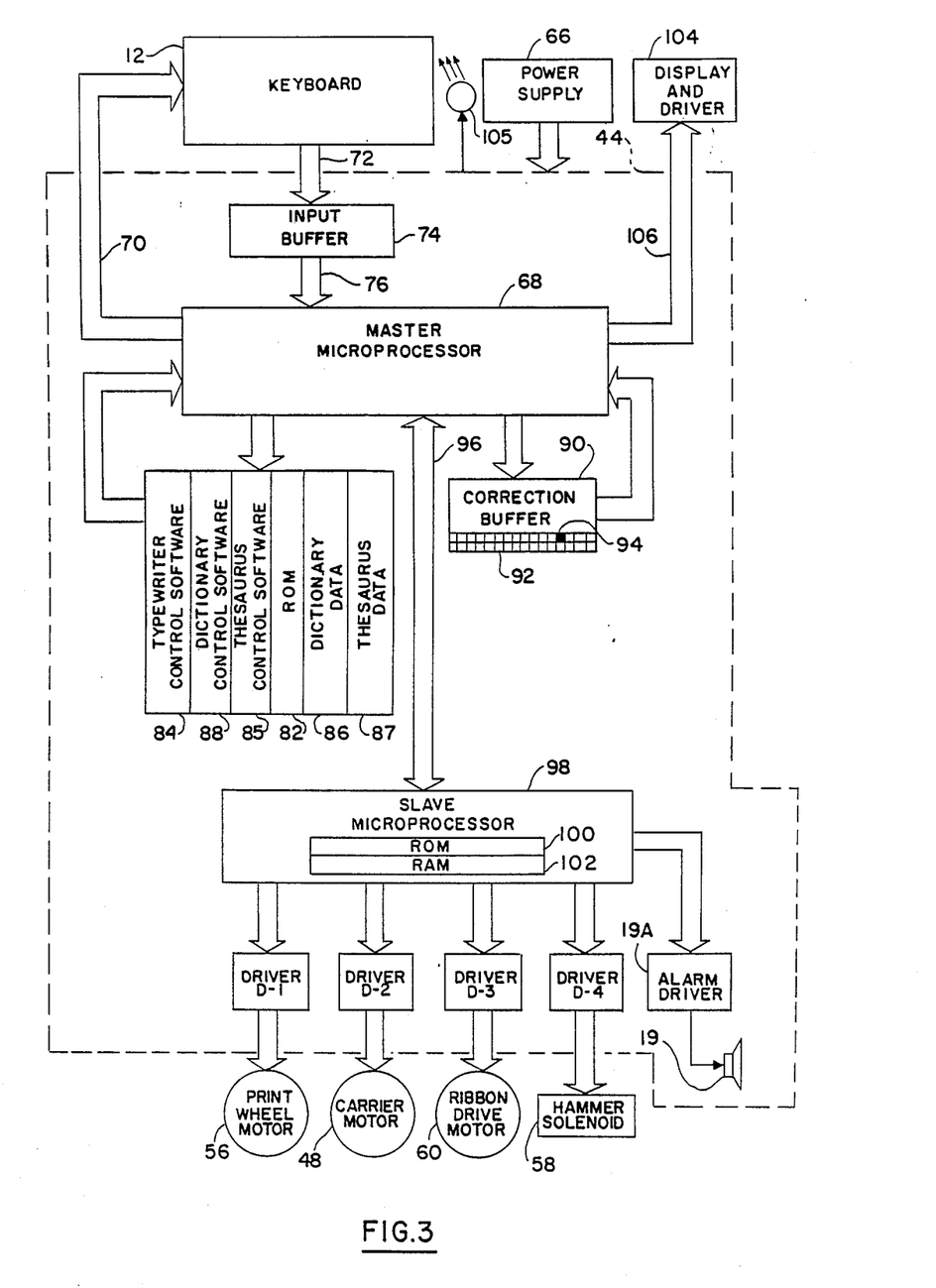
FIG. 3 is a block diagram of the electronics for controlling functional operations of the typewriter including the thesaurus feature.

The block diagram of FIG. 3 provides an overall view of the control circuitry 44 used for implementing the thesaurus feature of the present invention. A power supply 66 is connected to supply the electric power necessary to operate the various electronic components in control circuitry 44. As is shown in FIG. 3, keyboard 12 communicates with a known master microprocessor 68 as a result of an equally known interrupt technique issued periodically (e.g. every 7 milliseconds) on bus line 70. Master microprocessor 68 is a known electronic component, such as, the 8031 made by Intel Corporation of Santa Clara, Calif. As a result of the interrupt, the keyboard 12, and, more particularly, the matrix arrangement of keys is scanned to detect any key actuation. A logic code signal representative of a key actuation appears on bus line 72 extending to an input buffer 74.

Master microprocessor 68 receives data from input buffer 74 via bus line 76. The input buffer 74 is a hex non-inverting buffer, such as a CD 4503 manufactured by National Semiconductor of Santa Clara, Calif.

Master microprocessor 68 is associated with external electronics including a ROM unit 82 for controlling operation of master microprocessor 68. Included in ROM unit 82 is typewriter control software 84, dictionary data 86 comprising character codes forming lists of words, dictionary control software 88, thesaurus control software 85 and thesurus data 87. A correction buffer 90 is operatively associated with master microprocessor 68 and includes a stack of memory cells or code memory registers 92 for storing code information of selected characters processed by master microprocessor 68. The correction buffer 90 is addressable by a display cursor or a find pointer 94 (shown solid), located at one register corresponding to the current location of carrier 18. In this regard the character of the current carrier 18 position can be recalled from correction buffer 90 for correction purposes. Find pointer 94 progressively moves through the stack of memory registers 92 in conjunction with movement of carrier 18 so that one register has character information of a related one character position along platen 14. A 4096 bit (1024×4 bits) static RAM identified as 2114 preferably comprises correction buffer 90.

A character code signal ready for typewriter processing is sent along line 96 (output channel) from microprocessor 68 to a further microprocessor 98 which is slaved with respect to microprocessor 68 as master. Slave microprocessor 98 (e.g. the 8051 also made by Intel and identical to the 8031 except for program memory) has an internal program stored in ROM (4K×8 read only memory) 100 and the code data being stored in a RAM (128×8) 102. Code data is read from RAM 102 as necessary for the program in ROM 100 to develop, in known fashion, the control and drive signals for operations control of the various elements of carrier 18 namely, print wheel motor 56, carrier motor 48, ribbon drive motor 60 and hammer solenoid 58.

The dictionary control software 88 compares character code signals for each character entered from the keyboard 12 with character code signals forming the list of words in the dictionary data 86 for detecting spelling errors. When a spelling error is detected, the control circuit 44 provides an audible warble (not shown) to inform the operator that an error has occurred. This is accomplished by audible sound device 19 driven by alarm driver 19A, as shown in FIG. 3. Also when a spelling error is detected, an error bit (code signal) is added to the code memory register 92 in the correction buffer 90 corresponding to the print position of the spelling error. The purpose for adding an error bit at the print position will be explained below.

The thesaurus database consists of lists of words that are synonymous with each other. Words are separated by a special word separator code, while lists are separated by two successive word separator codes. This eliminates the need for a different list separator code, thus reducing the character set and improving compression.

Immediately following the list separator code is a part of speech code, which identifies the part of speech of the words in the list. (Since the words are synonyms, they will all be the same part of speech.) The part of speech code is used to show on the display the part of speech of the list.

Following is a fragment from a typical thesaurus list. The word separator code is shown by a semicolon (;)

and the part of speech is shown by a capital letter (N for noun, V for verb, A for adverb, J for adjective).

... ;;Vabandon;desert;forsake;;Vabbreviate;shorten;-cut;;Nability;capability;competence;; ....

The word list would then be encoded using the code described above to complete the database. The database is stored in a read only memory 87 for access by the microprocessor 68.

In addition to the word list database itself, the dictionary database is also modified for the thesaurus. Each word that occurs in the thesaurus is identified in the dictionary by a code following the word. Each time the code is encountered when a spelling check is done, a flag is set to indicate that the word just checked occurs in the thesaurus.

External drivers D-1, D-2, D-3 and D-4 are connected to receive code data read from RAM 102 of slave microprocessor 98 for controlling operation of motors 56, 48, 60 and solenoid 58, respectively. Drivers D-1, D-2, and D-3 are conventional quad drivers (e.g. 2069) for decoding the data and for issuing appropriate control signals to connected motors 56, 48, and 60. The drive control signals regulate precise angular rotation and direction of motors 56, 48, and 60. Driver D-1 issues appropriate signals to print wheel motor 56 for rotatably positioning print wheel 16 according to the code generated by one of the character keys 34. Driver D-2 develops the signals necessary for stepping carrier motor 48 to incrementally move carrier 18 through character positions along platen 14, driver D-3 controls the ribbon drive motor 60, such that, print ribbon 28 is operated (via linkage 62) for printing when motor 60 is energized to rotate in one direction (clockwise in FIG. 2) and correction ribbon 32 is enabled (via linkage 64) for rasing when motor 60 is energized to rotate in the opposite (counterclockwise) direction. Typewriter 10 is operating in corrections mode when ribbon drive motor 60 is controlled to rotate in the counterclockwise direction enabling ribbon 32. Driver D-4 is in the form of a known kind of electronic latch for controlling operation of hammer solenoid 58 and is timed with respect to the other drivers D-1, D-2 and D-3 such that hammer 24 is actuated after print wheel character selection is made and one of the ribbons 28, 32 is elevated.

The thesaurus feature for finding synonyms, as defined by the present invention, is equally as useful when installed in an electronic typewriter having a combination of an electronic spelling dictionary feature and a character display unit. A character display unit 104 (FIG. 1) is built into the typewriter 10. This display unit 104 has a commonly used maximum capacity display of sixteen characters. The display unit 104 (FIG. 3) is connected to receive code data from the master microprocessor 68 via bus line 106 for entering characters on the display unit 104.

One method of initializing the operation of the thesaurus feature is to depress a function or code key 108 on the keyboard 12. The function key 108 is dedicated as a single key operation for the present invention. Another method of initializing the operation is to depress a multiple key sequence. The sequence is first depressing the code key 42 and then depressing a thesaurus key 112. The key 112 is a character key 34 representing the letter "T". It is common practice to use a character or number key 34 on the keyboard 12 in combination with a code key 42 to operate a typewriter function other than the specific character or number.

Figure 4:
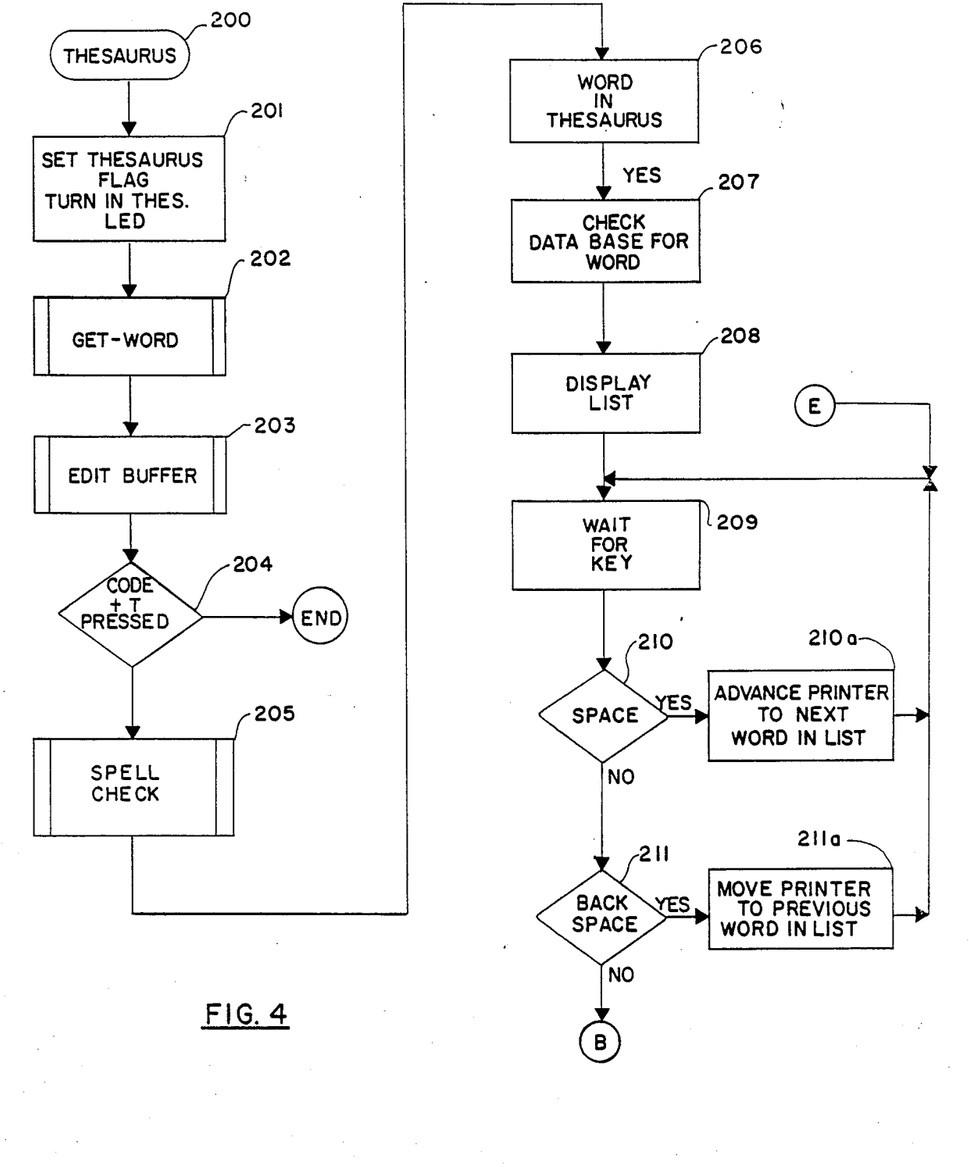
FIGS. 4, 5, and 6, taken together, comprise a flow chart illustrating the operation of the thesaurus feature.

In the flow chart of FIG. 4 the following conventional box shapes are used: Boxes with semi-circular ends represent the start of a subroutine, a rectangle box represents a processing function or an operation, and a diamond box represents a decision for selecting one of two alternative outputs. The small circles enclosing single alphabetic characters are used to indicate multiple connections, e.g., the circle bearing the letter "B" in FIG. 4 indicates a connection with the circle bearing the letter "B" in FIG. 5. As with most microprocessors, the control circuit 44 of FIGS. 1 and 3 has a regular program idling loop in which it makes rounds or sequential interrogations of the various registers and initiates certain routines or operations according to the status of those registers or flags.

For clarity and ease of description, only the portions of routines relative to the present thesaurus feature are described below, or shown in the accompanying flow charts.

The thesaurus may be used in any mode in which text may be typed or entered into memory. The operation in different modes differs only in the method of obtaining the input word and the method of replacing the input word by a selected word. The routines needed to perform these functions are well known and will not be described here. These routines are identified by the names GET_WORD for the routine to get a word from the correction buffer, line buffer, or editable memory; and REPLACE_WORD for the routine that replaces the input word in the appropriate manner depending on the mode of operation.

When the typist wishes to obtain synonyms for a particular word, he activates the thesaurus program 200 by holding the CODE key 42 while pressing the "T" key 112 (hereafter referred to as CODE+T) in the same manner as he would request a shifted character by holding the SHIFT key 109 while pressing a character key 34. The character display unit 104 clears and then shows the messge "thesaurus" for a period of approximately ½ seconds to indicate that the thresaurus program had been activated. In addition, an LED 105 on the front of the typewriter 10 lights to indicate that the thesaurus is active as indicated by rectangular box 201. It remains lit until the thesaurus is deactivated. The thesaurus program 200 calls the GET_WORD routine 202 to get the word in a manner which depends upon the mode of operation as described above. This word is then displayed. (If no word exists, a blank display is shown.) The typist may then edit the word in the same manner as in all display modes in order to change the word to its root form 203.

When the typist is satisfied with the word, he presses a selected character key 34 hereinafter designated as the INDEX key 113 to begin the search. The thesaurus program first calls the dictionary routine, passing the edited word as a parameter. During the dictionary routine the microprocessor 68 uses the dictionary control software 88 to examine the dictionary data storage 86 (both shown in FIG. 3). The dictionary routine performs a spelling check 205 on the word, setting the thesaurus flag if the thesaurus code is present following the word in the dictionary database. The thesaurus program then checks the flag. If the flag is not set, the message "NO SYNONYMS FOUND" is displayed for approximately ½ second, after which the word is brought back for re-editing. This process may be repeated until the edited word is identified as a thesaurus word (the flag being set after the dictionary call), or the typist exits the thesaurus program by pressing CODE+T 204.

When the word is found to be a thesaurus word 206 (the flag being set by the dictionary routine), a spelling check 205 is made as the thesaurus program begins scanning 107 the database, comparing the input word to each word in the database. When a match is found, the list 208 in which the match occurs is shown on the display unit 104. The first character of the display unit 104 is a capital letter indicating the part of speech followed by a colon, followed by the words in the list serially, separated by spaces. The input word is suppressed from the display list. A display cursor will appear in the character display unit 104. A display cursor will appear under the first character of the first word of the list.

While waiting for the typist input 209, the thesaurus program continues the scan, maintaining a record of all matches found for the input word until the end of the list is encountered. This mimimizes the time necessary to find subsequent occurrences of the input word. The typist may use the space bar 36 and BACKSPACE key 38, INDEX key 113, and REVERSE INDEX key 114 to select one of the synonyms, decision numbers 210, 211, 212, and 213. The space bar 36 will move the cursor to the next word in the list being displayed 210 and 210a. (If the list is too long to be shown on the display unit 104, it will be scrolled so that the currently selected word is always shown in its entirety.) The BACKSPACE key 38 will move the cursor to the previous word in the currently displayed list 211 and 211a.

Figure 5:
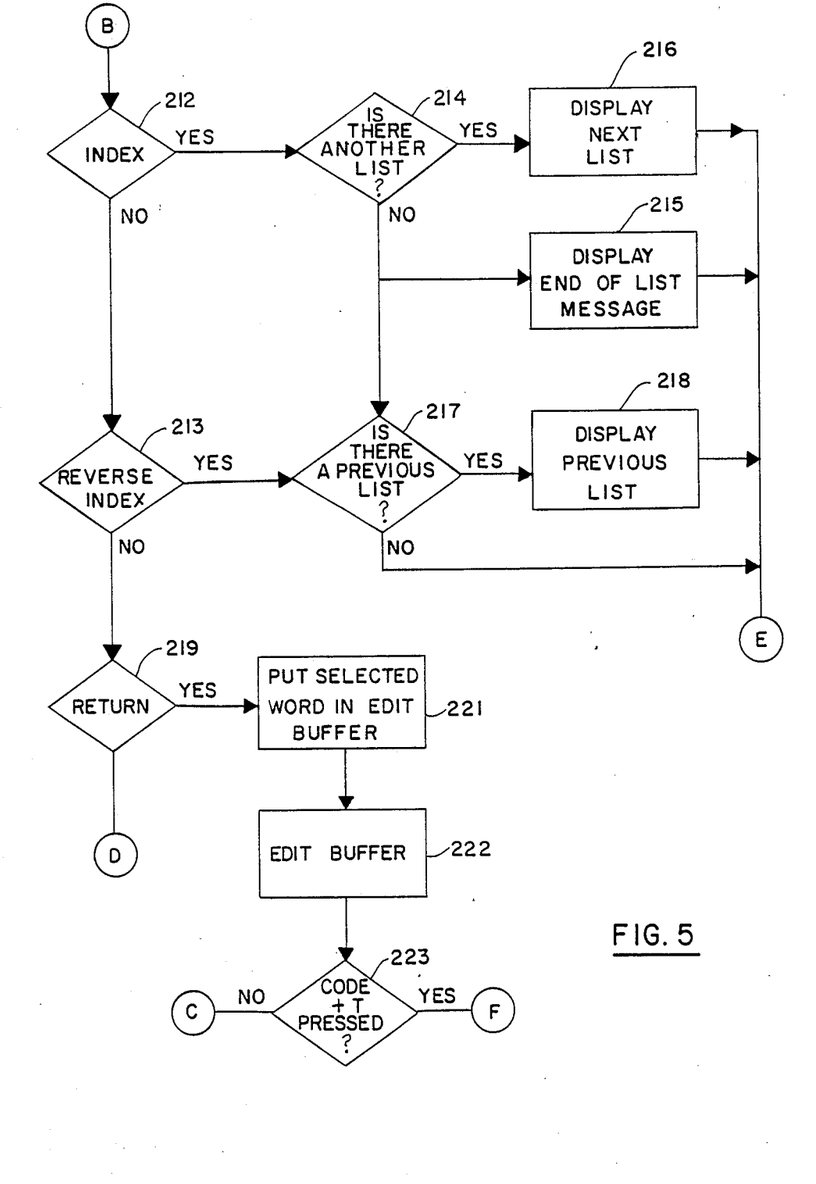

Referring to FIG. 5 the INDEX key 113 will show on the display unit 104 the next list in which the input word occurs 212 and 214. If there is no next list, the message "END OF LIST" is displayed for approximately ½ second 215, after which the last list is redisplayed. If there is another list, the next list is displayed 216. If the decision point 212 output is "no," the REVERSE INDEX decision point 213 will provide an output to decision point 217. Where the answer to the question of a previous list is "yes," the previous list will be displayed 218. If the answer is "no," the program loops to the "wait" operation 209. The outputs resulting from "yes" decisions at 210, 211, 212, and 213 are all returned to the "wait" point 209.

When the cursor is positioned on the desired synonym, the typist presses RETURN key 40 (decision 219). At this time, the selected word is placed in the edit buffer 220 and 221 shown on the display unit 104 for editing to the form of the original word. Pressing RETURN key 40 again causes the thesaurus program to call the REPLACE WORD routine (224 of FIG. 6), which will delete the original word and replace it with the edited selected word according to predefined rules.

Figure 6:
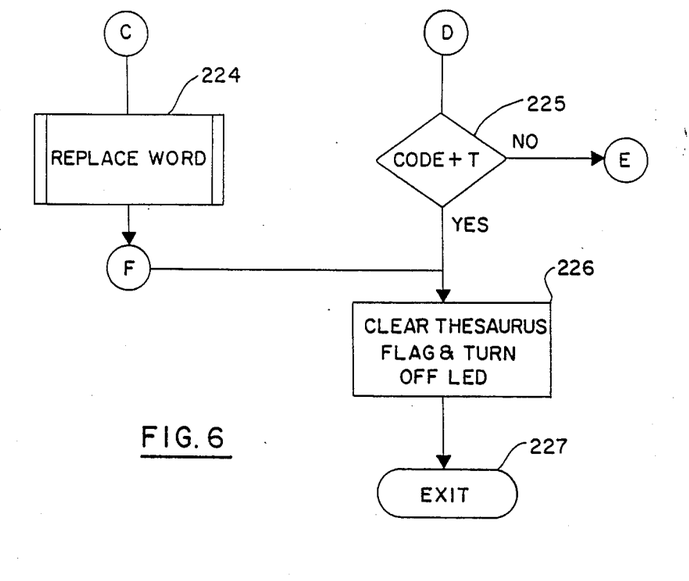

As FIGS. 5 and 6 show any time while the thesaurus is active, pressing CODE+T will end the thesaurus program 223, 225, 226 and 227. The original word will not be replaced and the typewriter 10 will return to the mode it was in when the thesaurus was activated.

The typewriter 10 may also have a well known feature called Word Count that involves the thesaurus. Word Count counts the number of occurrences of each word in a memory file to allow the typist to determine whether he is overusing certain words. While showing the words and their counts on the display, the LED 105 on the front of the typewiter 10 will blink if the currently displayed word is in the thesaurus. The typist may then activate the thresaurus and view synonyms for that word. However, editing of the input and selected word is not allowed and replacement is likewise not allowed. The thesaurus in this instance is informational only.

The various steps in the program, as described above, are shown in the flow diagrams of FIGS. 4, 5, and 6, arranged and having legends which describe the various steps in the program.

From all the foregoing, it will be apparent to those skilled in the art that our invention provides a unique method and means of providing a synonym finding arrangement, or thesaurus feature for an electronic typewriter, characterized by ease of operation by the typist and efficient use of storage space in the typewriter's electronic system. Distinctive operating information is provided to the operator or typist by a suitable LED indicator as well as by the typewriter display.

Although we have herein shown and described only one preferred embodiment of our invention, it will be apparent to those skilled in the art to which the invention appertains, that various other changes and modifications may be made to the subject invention without departing from the spirit and scope thereof, and therefore it is to be understood that all modifications, variations and equivalents within the spirit and scope of the subject invention are herein meant to be encompassed in the appended claims.

What is claimed is:

1. A thesaurus feature for an electronic typewriter having an electronic spelling dictionary memory and an electronic thesaurus memory, said typewriter including a keyboard for transmitting character signals to said spelling dictionary memory and said electronic thesaurus memory, said spelling dictionary memory and said electronic thesaurus memory each having a data base stored therein and control signals stored in another electronic memory, a plurality of words are stored in a data base in said spelling dictionary memory and each of said words including a special code character immediately following each word which also appears in the data base of said thesaurus memory, the data base being stored in the said thesaurus memory being words for serial access as lists of words that are synonymous with each other with the lists including a separator code identifying the part of the speech of the synonyms, word separator codes and list separator codes, means including said keyboard for inputting an input word for which synonyms are desired, means governed by said keyboard for initiating a thesaurus operation, scanning means for scanning the data base of said thesaurus memory, means for retrieving said words from said data base by matching the input word, whereby the presence of synonyms for said input word is determined by the position of the list, word and part of speech code, and display means for sequentially displaying any synonyms found for said input words.

2. A thesaurus feature for an electronic typewriter as claimed in claim 1, further characterized by including means for indicating to the typist that said thesaurus feature is activated.

3. A thesaurus feature for an electronic typewriter as claimed in claim 2, further characterized by said indicating means comprising a visible indicator.

4. A thesaurus feature for an electronic typewriter as claimed claim 1, further characterized by including a plurality of keyboard operations for governing the operation of said thesaurus operation, said keyboard operations being similar to keyboard operations for governing other known features for the typewriter.

5. A thesaurus feature for an electronic typewriter as claimed in claim 1, further characterized by including means for cascading the operations of scanning said data base and displaying synonyms found by said scanning operations.

6. A thesaurus feature for an electronic typewriter as claimed in claim 5, further characterized by overlapping the operation of said scanning means and said display means whereby the display for one synonym search is operative while the scanning operation for a subsequent synonym search is taking place.

7. A thesaurus feature for an electronic typewriter as claimed in claim 1, further characterized by including means for initiating a synonym search by simultaneous operation of a command code key on said keyboard with a specific key on said keyboard.

8. A thesaurus feature for an electronic typewriter as claimed in claim 7, further characterized by said keys being specifically identified as the "Code" key and the "T" key respectively.

9. A thesaurus feature for an electronic typewriter as claimed in claim 1, further characterized by indicating to the typist when no synonym is found by the thesaurus feature for a specific input word.

10. A thesaurus feature for an electronic typewriter as claimed in claim 1, further characterized by means governed by said keyboard for selecting one of a plurality of synonyms found by said thesaurus feature.

* * * * *